(12) United States Patent
Huang et al.

(10) Patent No.: US 12,528,220 B2
(45) Date of Patent: Jan. 20, 2026

(54) ULTRASONIC DEVICE

(71) Applicant: SILICONWARE PRECISION INDUSTRIES CO., LTD., Taichung (TW)

(72) Inventors: Yu-Lung Huang, Taichung (TW);
Chih-Hui Huang, Taichung (TW);
Cheng-Ying Hsieh, Taichung (TW);
Sin-Cyuan Lin, Taichung (TW);
Men-Yeh Chiang, Taichung (TW);
Chao-Lin Chang, Taichung (TW);
Ting-Hsu Lu, Taichung (TW)

(73) Assignee: SILICONWARE PRECISION INDUSTRIES CO., LTD., Taichung (TW)

( * ) Notice: Subject to any disclaimer, the term of this patent is extended or adjusted under 35 U.S.C. 154(b) by 381 days.

(21) Appl. No.: 17/863,794

(22) Filed: Jul. 13, 2022

(65) Prior Publication Data

US 2023/0381996 A1  Nov. 30, 2023

(30) Foreign Application Priority Data

May 25, 2022 (TW) .................................. 111119498

(51) Int. Cl.
*B26D 7/08* (2006.01)
*H01L 21/67* (2006.01)

(52) U.S. Cl.
CPC ........ *B26D 7/086* (2013.01); *H01L 21/67092* (2013.01)

(58) Field of Classification Search
CPC .... B26D 7/086; H01L 21/67092; B28D 5/047
USPC ............................................................ 83/761
See application file for complete search history.

(56) References Cited

U.S. PATENT DOCUMENTS

| | | | |
|---|---|---|---|
| 6,190,296 B1 * | 2/2001 | Gnad | B29C 66/92211 53/DIG. 2 |
| 2009/0146530 A1 * | 6/2009 | Tang | B28D 5/047 310/323.18 |
| 2015/0143706 A1 * | 5/2015 | Bek | B27B 19/006 30/393 |
| 2024/0050112 A1 * | 2/2024 | Funder | A61B 17/22012 |

FOREIGN PATENT DOCUMENTS

JP          03293976 A  * 12/1991
WO   WO-2006022749 A1 *  3/2006 ............. A61F 15/02

* cited by examiner

*Primary Examiner* — Nhat Chieu Q Do
(74) *Attorney, Agent, or Firm* — Dority & Manning, PA (57) ABSTRACT

An ultrasonic device is provided and includes an action member, a driving member and a rotating shaft connected to the driving member. The action member provides ultrasonic vibration and vibrates the driving member, so that the driving member oscillates to make the rotating shaft and a cutter oscillate in the same direction together, so the cutter can remove scrap by oscillating during the cutting operation.

11 Claims, 10 Drawing Sheets

ULTRASONIC DEVICE

BACKGROUND

1. Technical Field

The present disclosure relates to an ultrasonic device, and more particularly, to an ultrasonic device for cutting operation.

2. Description of Related Art

In recent years, with miniaturization and light weight of mobile devices such as mobile phones or tablets, or information storage devices performing information access through memory cards, the thinning of the semiconductor chips assembled in aforementioned devices has been accelerated.

Currently, in the singulation process of the semiconductor wafers, a blade is used to cut a full-panel package or wafer to obtain a plurality of chip modules or semiconductor chips.

However, in the integrated circuit (IC) products of the fifth generation mobile networks (5G), for cutting conditions such as thick chip modules or thin semiconductor chips, low dielectric constant (low K) heterogeneous material multi-layer structure, narrow cutting paths, large-panel structure warpage (large internal stress), etc., current cutting operations adopting conventional grinding technique is prone to generate scrap, and meantime it will reduce the flexural strength of the chip modules or semiconductor chips and cause chipping issues, so it is difficult to obtain high yield, such that the conventional grinding technique is no longer suitable for the singulation process of 5G IC products. For instance, when there is scrap on the cutting path of a wafer, the blade will rub the wafer through the scrap. At this time, the closer the blade is to the bottom area of the wafer, the more passivated the blade surface will be. Therefore, the grinding force needs to be increased, so that the stress will be concentrated around the cutting path, causing the wafer to be cracked or chipped, i.e., brittle failure.

In addition, although the industry has adopted cutting blades with better quality to overcome the chipping and scrap jamming issues, the cost of the cutting blades served as consumables is too high to be suitable for mass production.

Therefore, how to overcome the aforementioned drawbacks of the prior art has become an urgent issue to be addressed at present.

SUMMARY

In view of the various shortcomings of the prior art, the present disclosure provides an ultrasonic device, which comprises: a carrier; a driving member disposed on the carrier in an oscillating manner; an action member configured to actuate the driving member to oscillate the driving member; and a rotating shaft connected to the driving member, wherein the driving member drives the rotating shaft to oscillate together, and the rotating shaft rotates relative to the carrier.

In the aforementioned ultrasonic device, the carrier is a housing and has an accommodation space therein to accommodate the driving member and the action member, wherein the rotating shaft is exposed to the accommodation space by passing through the carrier.

In the aforementioned ultrasonic device, the driving member is an arm body. For instance, one side of the driving member is pivotally connected to the carrier, such that the other side of the driving member is displaced relative to the one side of the driving member.

In the aforementioned ultrasonic device, the driving member is pivotally connected to the carrier via a shaft member. For instance, the shaft member is fixed to the carrier.

In the aforementioned ultrasonic device, the action member is in a form of an ultrasonic piezoelectric sheet.

In the aforementioned ultrasonic device, the present disclosure further comprises an elastic member connected to the driving member, wherein the elastic member is fixed on the carrier.

In the aforementioned ultrasonic device, the present disclosure further comprises a pressure sensor for sensing pressure on the driving member.

In the aforementioned ultrasonic device, the present disclosure further comprises a cutter disposed on the rotating shaft.

In the aforementioned ultrasonic device, the present disclosure further comprises a driver for driving the rotating shaft to rotate. For instance, the driver has a power shaft linked with the rotating shaft, wherein the power shaft and the rotating shaft are not coaxial. Alternatively, the driver is connected to the rotating shaft via a flexible coupling.

As can be understood from the above, in the ultrasonic device of the present disclosure, the action member actuates the driving member to oscillate the driving member, so that the driving member also drives the rotating shaft and the cutter to synchronously oscillate in the same direction, such that the cutter can perform cutting, scrap removal and lubrication during the cutting operation. Therefore, compared with the prior art, the ultrasonic device of the present disclosure can address the problems caused by the conventional grinding technique by using a general circular cutting blade, so as to avoid problems such as chipping and scrap jamming. The present disclosure not only can improve the production capacity, but also greatly reduce the cost of cutting operations for mass production, and even increase the service life of the cutter.

BRIEF DESCRIPTION OF THE DRAWINGS

FIG. 2A-1 is a schematic cross-sectional view along an A-A cross-sectional line of FIG. 1.

FIG. 2A-2 is a schematic cross-sectional view depicting one aspect of FIG. 2A-1 when oscillating.

FIG. 2A-3 is a schematic cross-sectional view depicting another aspect of FIG. 2A-1 when oscillating.

DETAILED DESCRIPTIONS

Implementations of the present disclosure are illustrated using the following embodiments. One of ordinary skill in the art can readily appreciate other advantages and technical effects of the present disclosure upon reading the content of this specification.

It should be noted that the structures, ratios, sizes, etc. shown in the drawings appended to this specification are to be construed in conjunction with the disclosure of this specification in order to facilitate understanding of those skilled in the art. They are not meant to limit the implementations of the present disclosure, and therefore have no substantial technical meaning. Any modifications of the structures, changes of the ratio relationships, or adjustments of the sizes, are to be construed as falling within the range covered by the technical content disclosed herein to the extent of not causing changes in the technical effects created and the objectives achieved by the present disclosure. Meanwhile, terms such as "on," "under," "left," "right," "front," "rear," "a," and the like recited herein are for illustrative purposes, and are not meant to limit the scope in which the present disclosure can be implemented. Any variations or modifications to their relative relationships, without changes in the substantial technical content, should also to be regarded as within the scope in which the present disclosure can be implemented.

Figure 1:
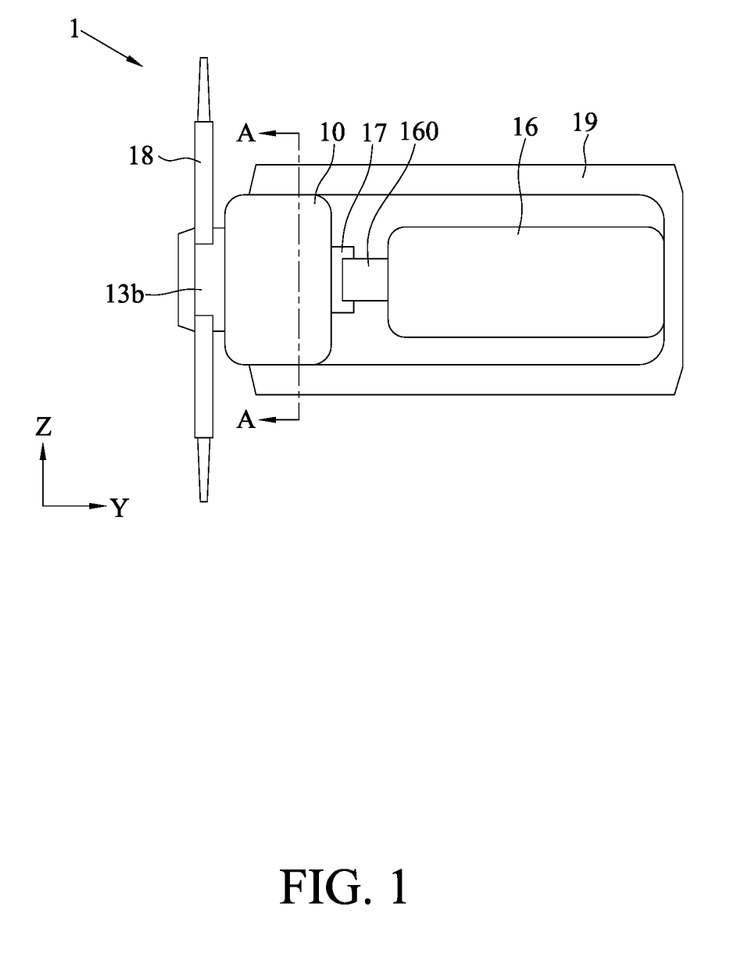
FIG. 1 is a schematic side view of an ultrasonic device of the present disclosure.
Figure 2A:
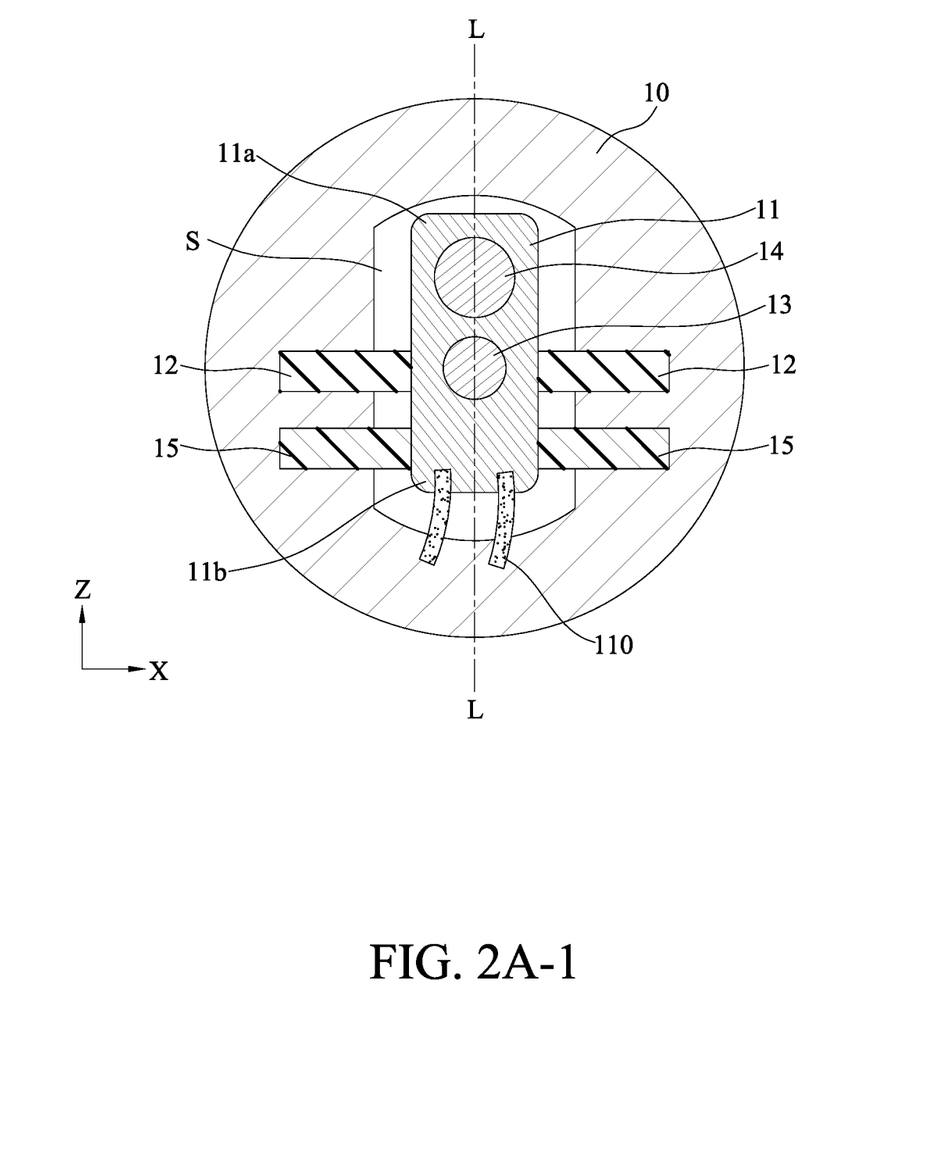
Figure 2A:
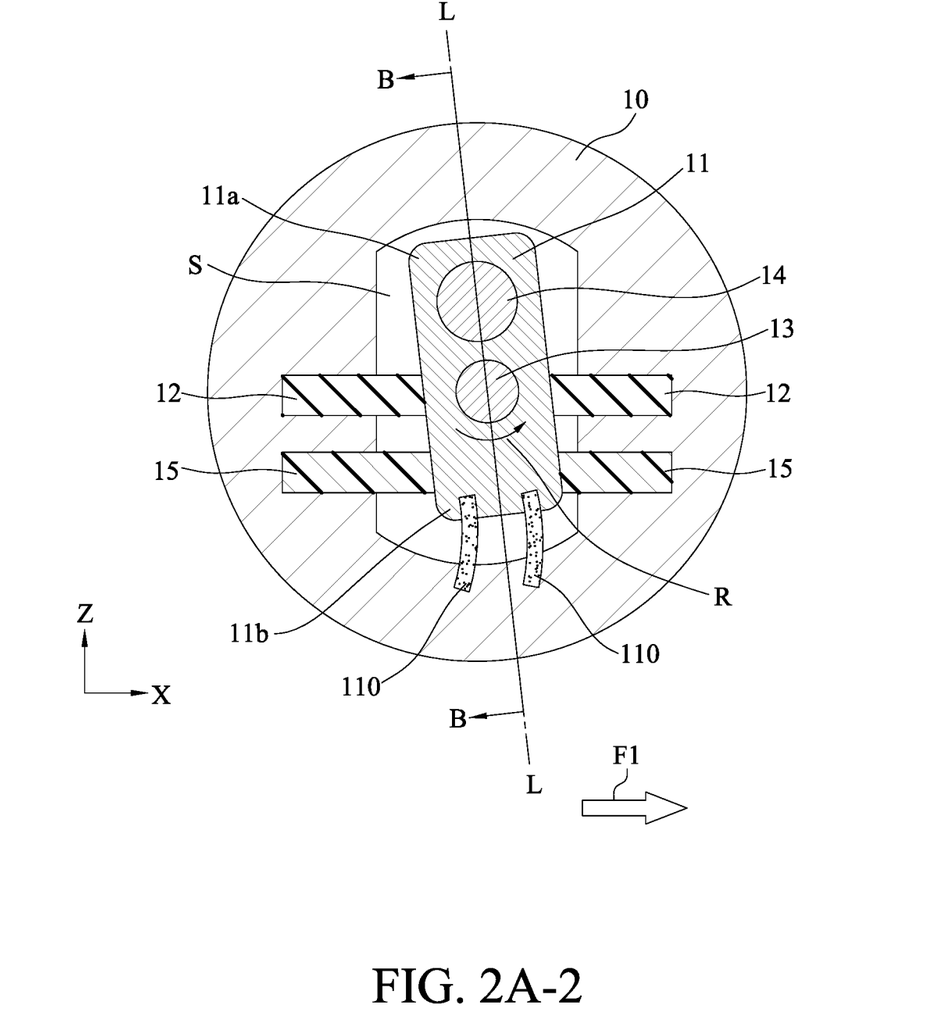
Figure 2A:
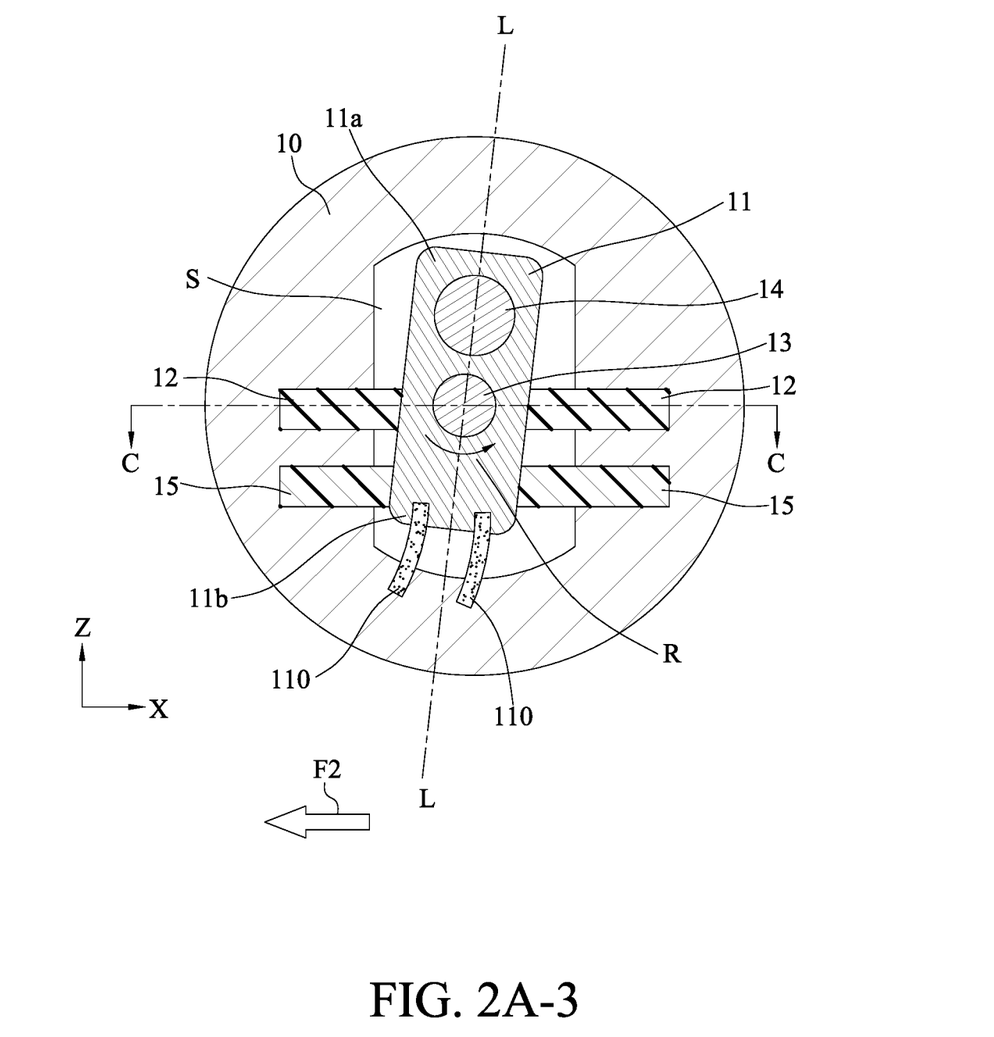

FIG. 1 is a schematic side view of an ultrasonic device 1 of the present disclosure. FIG. 2A-1 is a schematic cross-sectional view along an A-A cross-sectional line of FIG. 1. As shown in FIG. 1 and FIG. 2A-1, the ultrasonic device 1 comprises a carrier (or carrier body) 10, a driving member 11, at least one action member 12 and a rotating shaft 13.

In an embodiment, the ultrasonic device 1 defines the processing direction as the front and rear directions of the horizontal plane (e.g., Y-axis direction as shown in FIG. 1), defines the direction perpendicular to the processing direction as the left and right directions of the horizontal plane (e.g., X-axis direction as shown in FIG. 2A-1), and defines the height direction along the ultrasonic device 1 as the up and down directions perpendicular to the horizontal plane (e.g., Z-axis direction as shown in FIG. 1 and FIG. 2A-1). It should be understood that the orientations are used for illustrating the configuration of embodiments of the present disclosure, and the present disclosure is not limited to as such.

The carrier 10 is a housing and has an accommodation space S therein (as shown in FIG. 2A-1) to accommodate the driving member 11 and the action member 12.

The driving member 11 is disposed in the accommodation space S (as shown in FIG. 2A-1) and can be disposed in the carrier 10 in a movable (oscillating) manner (as shown in FIG. 2A-2 and FIG. 2A-3).

In an embodiment, the driving member 11 is an arm body, so that a section 11a (e.g., the upper section as shown in FIG. 2A-1) on one side of the driving member 11 is pivotally connected to the carrier 10, such that a section 11b (e.g., the lower section as shown in FIG. 2A-1) on the other side of the driving member 11 can be displaced relative to the upper section. For instance, the section 11b (e.g., the lower section as shown in FIG. 2A-1) on the other side of the driving member 11 can be connected to at least one elastic member 110 such as a leaf spring, and the elastic member 110 is disposed in the accommodation space S and fixed on the lower inner wall of the accommodation space S of the carrier 10.

Figure 2B:
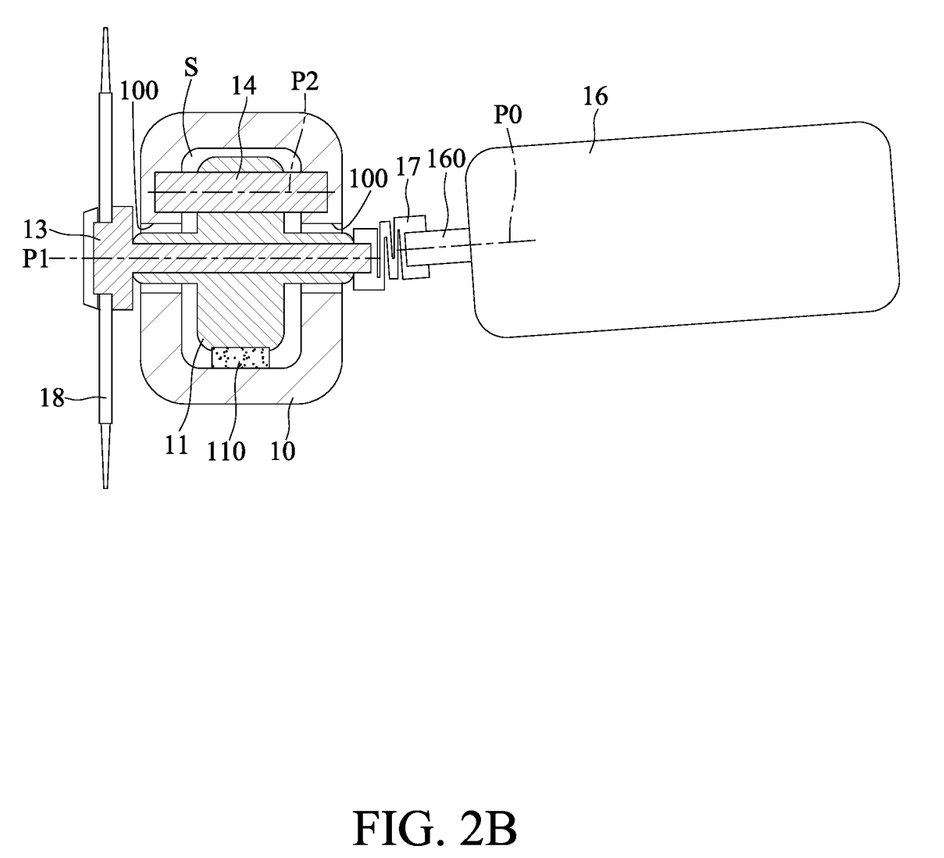
FIG. 2B is a schematic cross-sectional view along a B-B cross-sectional line of FIG. 2A-2.

Moreover, the driving member 11 is pivotally connected to the carrier 10 via a shaft member 14, as shown in FIG. 2A-1. For instance, the shaft member 14 is a circular rod body, which is accommodated in the accommodation space S of the carrier 10 and passes through the section 11a (e.g., the upper section as shown in FIG. 2A-1) on one side of the driving member 11, so that the two opposite ends of the shaft member 14 are respectively fixed on the inner walls of the front and rear sides of the upper side of the accommodation space S of the carrier 10 (as shown in FIG. 2B).

The action member 12 is in a form of an ultrasonic piezoelectric sheet, which vibrates the driving member 11 so that the driving member 11 can move (e.g., the oscillation as shown in FIG. 2A-2 and FIG. 2A-3) relative to the shaft member 14 after being vibrated.

In an embodiment, the action member 12 is disposed on the inner walls of the left and right sides of the accommodation space S of the carrier 10, so as to actuate (e.g., drive) the driving member 11, such that the section 11b (e.g., the lower section as shown in FIG. 2A-1) on the other side of the driving member 11 can oscillate left and right relative to the shaft member 14 in a reciprocating vibration (e.g., oscillating directions F1, F2 as shown in FIG. 2A-2 and FIG. 2A-3). For instance, the distance between the action member 12 and the shaft member 14 can be adjusted to a certain distance (as shown in FIG. 2A-1, the action member 12 is aligned with the position of the rotating shaft 13 to drive the driving member 11), so as to achieve the objective of saving effort.

Furthermore, by the configuration of the elastic member 110, the oscillating speed and force of the driving member 11 can be buffered to prevent the section 11b (e.g., the lower section as shown in FIG. 2A-1) on the other side of the driving member 11 from colliding with the wall surface of the accommodation space S. Therefore, the elastic member 110 not only provides the structural stability of the driving member 11 when the driving member 11 oscillates, but also can reduce the structural inertia issue caused by the ultrasonic vibration, and can even reduce the reaction force received by the action member 12 when the ultrasonic device 1 is actuated.

The rotating shaft 13 rotates relative to the carrier 10 and is connected to the driving member 11, so that the driving member 11 drives the rotating shaft 13 to oscillate together, and the rotating shaft 13 is exposed to the accommodation space S by passing through the carrier 10 with its cylindrical shaft body.

In an embodiment, an axis P1 of the rotating shaft 13 and an axis P2 of the shaft member 14 are parallel to each other (as shown in FIG. 2B) and aligned with a center line L of the driving member 11 (as shown in FIG. 2A-1).

Moreover, at least one pressure sensor 15 can be disposed in the accommodation space S of the carrier 10 to sense and capture (e.g., receive) the grinding force generated by the rotating shaft 13. For instance, a set of the pressure sensors 15 are respectively disposed on the left and right sides of the rotating shaft 13 to adjust the grinding parameters in real time. Preferably, the distance between the pressure sensors 15 and the shaft member 14 can be adjusted to a certain distance (as shown in FIG. 2A-1, the pressure sensors 15 are disposed at the section 11b or lower section on the other side of the driving member 11) so as to facilitate signal amplification.

Figure 2C:
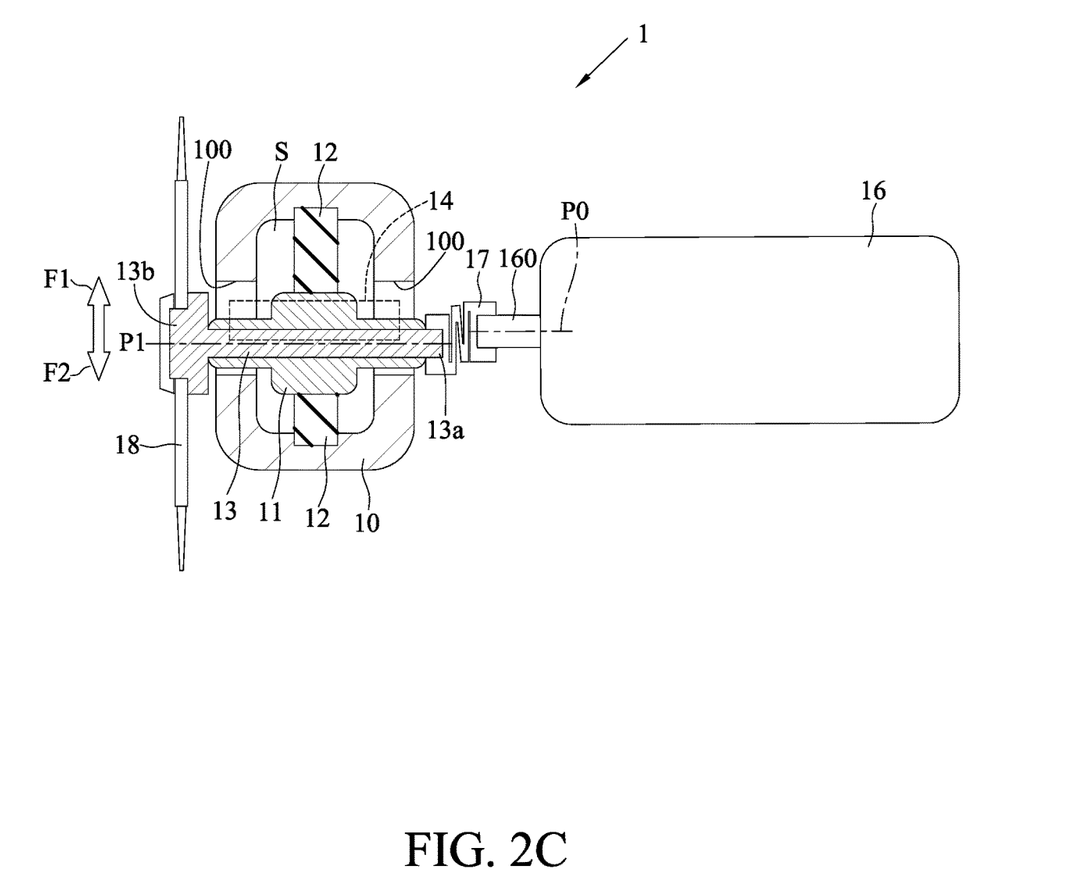
FIG. 2C is a schematic cross-sectional view along a C-C cross-sectional line of FIG. 2A-3.

Additionally, the ultrasonic device 1 drives the rotating shaft 13 to rotate via a driver 16. For instance, the driver 16 is such as a motor, which has a power shaft 160 linked with the rotating shaft 13, and the power shaft 160 and the rotating shaft 13 are not coaxial (as shown in FIG. 2B and FIG. 2C, the axis P1 of the rotating shaft 13 and an axis P0 of the power shaft 160 are different axes), such that the power shaft 160 is connected to the rotating shaft 13 via a flexible coupling 17, wherein the power shaft 160 and the rotating shaft 13 are served as the main shaft structure of the ultrasonic device 1. Preferably, the ultrasonic device 1 can be configured with a housing 19 to accommodate the carrier 10, the driver 16 and the flexible coupling 17.

In addition, one end portion 13a of the rotating shaft 13 is linked with the driver 16 or the flexible coupling 17, and the other end portion 13b of the rotating shaft 13 protrudes out of the carrier 10 to configure (e.g., fix) a cutter 18 like a circular cutting blade. It should be understood that the carrier 10 has a channel 100 that communicates with the front and rear sides of the accommodation space S (as shown in FIG. 2C) and serves as a region where the end portions 13a, 13b of the rotating shaft 13 oscillate left and right (e.g., the oscillating directions F1, F2 as shown in FIG. 2C).

Figure 3:
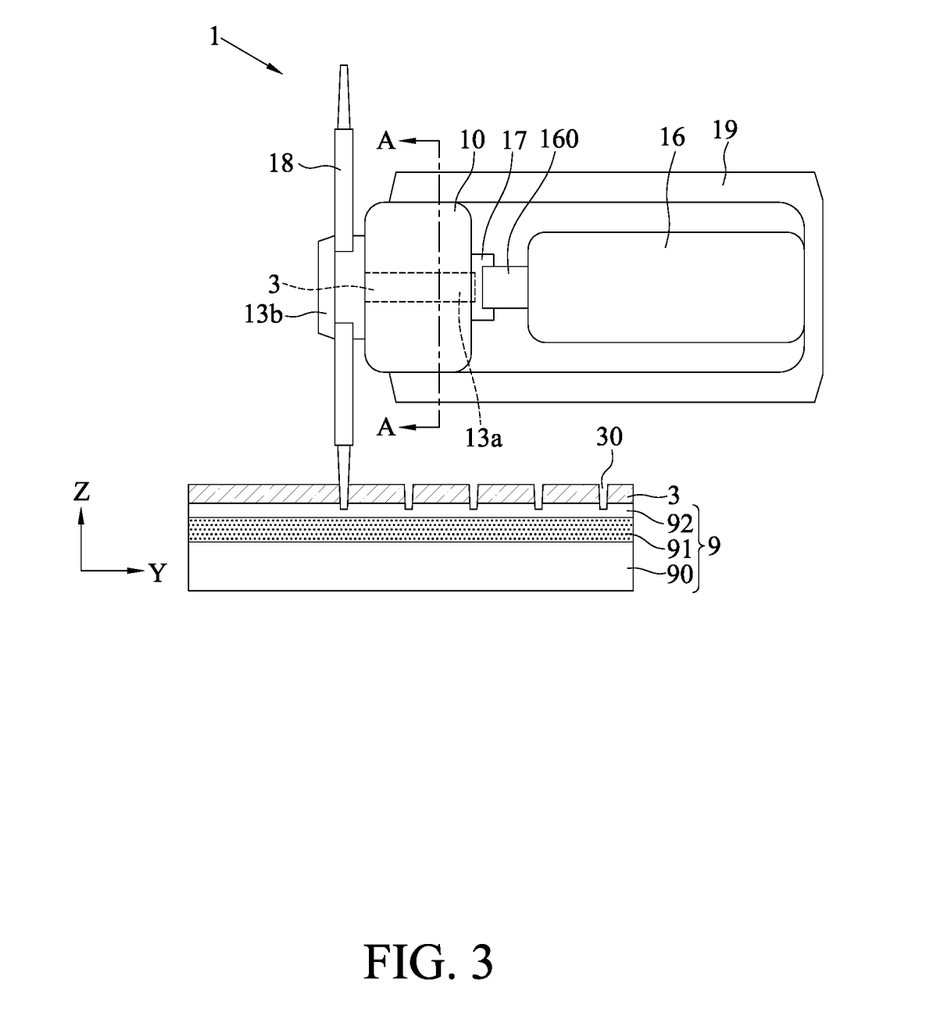
FIG. 3 is a schematic side view of a configuration of the ultrasonic device of the present disclosure when using.
Figure 4A:
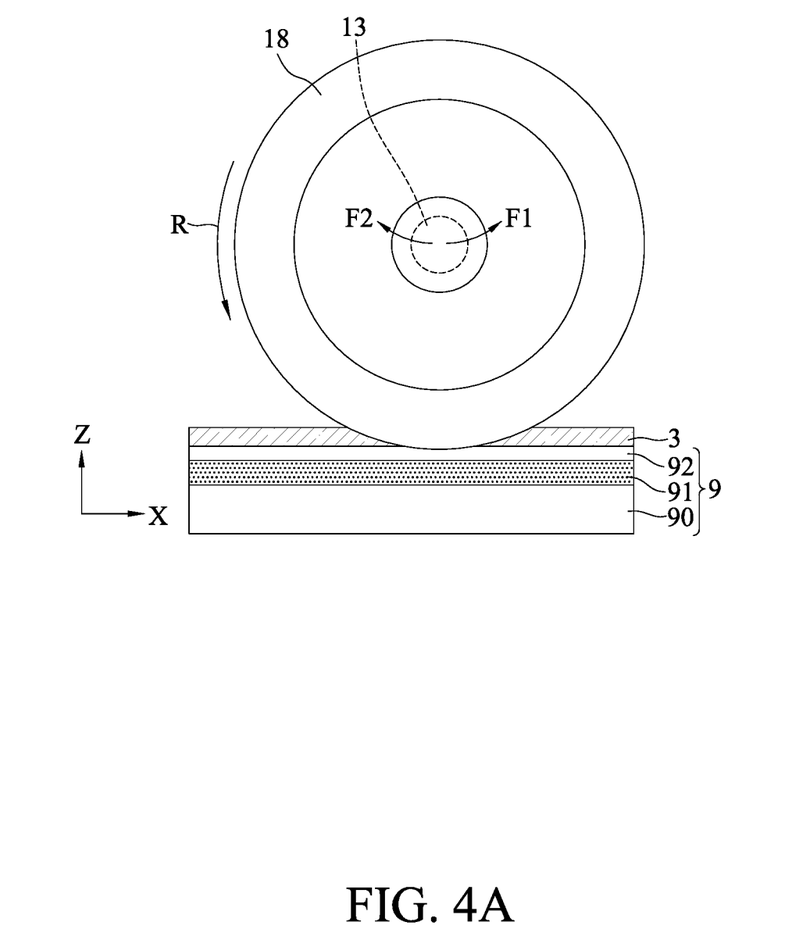
FIG. 4A is a schematic front view of the configuration of the ultrasonic device of the present disclosure when using.

When using the ultrasonic device 1, as shown in FIG. 3, the cutter 18 is aligned with or aimed at a target position (e.g., a cutting path) of a target object 3, and then the driver 16 transmits the kinetic energy of high-speed rotation via the flexible coupling 17 to rotate the rotating shaft 13 (e.g., a rotation direction R as shown in FIG. 2A-2), thereby causing the cutter 18 to rotate (e.g., the rotation direction R as shown in FIG. 4A) for ultrasonic grinding processing. Therefore, the cutter 18 can remove part of the material of the target object 3 to form trenches 30 on the target object 3.

In an embodiment, the target object 3 is a semiconductor wafer, which is disposed on a carrier member 9, where the carrier member 9 comprises a tape 90, a base film 91 bonded to the tape 90 and a die attach film 92 bonded to the base film 91, such that the target object 3 is bonded onto the die attach film 92, and the trenches 30 penetrate through the target object 3 and extend into the die attach film 92. That is, the cutter 18 also removes part of the material of the die attach film 92.

Hence, the action member 12 can provide radial (as shown in FIG. 2A-2 and FIG. 2A-3) ultrasonic vibration to the driving member 11, such that the rotating shaft 13 can drive the cutter 18 to rotate (e.g., the rotation direction R as shown in FIG. 4A) and oscillate (e.g., the oscillating directions F1, F2 as shown in FIG. 4A) together, so that the cutter 18 can perform scrap removal and lubrication due to oscillating when the cutter 18 performs the cutting operation on the target object 3 so as to avoid chipping and scrap jamming issues.

Figure 4B:
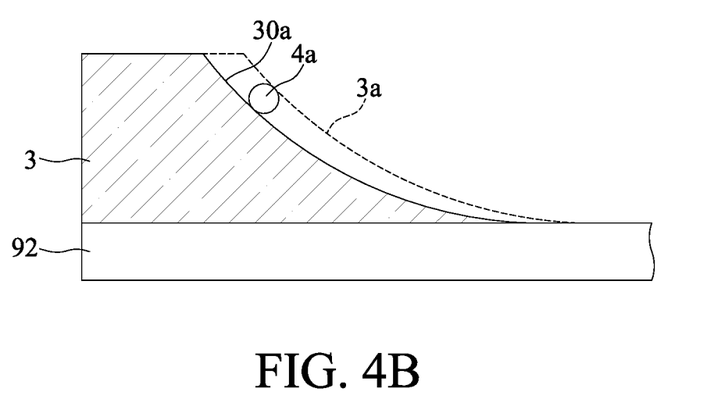
FIG. 4B to FIG. 4E are schematic partially enlarged views of FIG. 4A at different times during cutting operation.
Figure 4C:
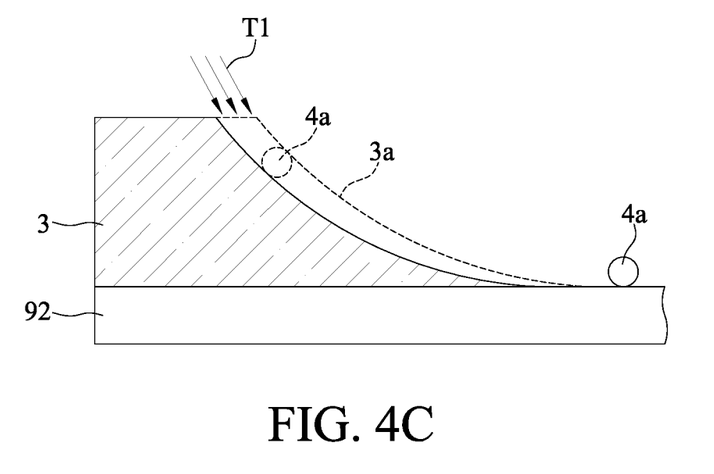
Figure 4D:
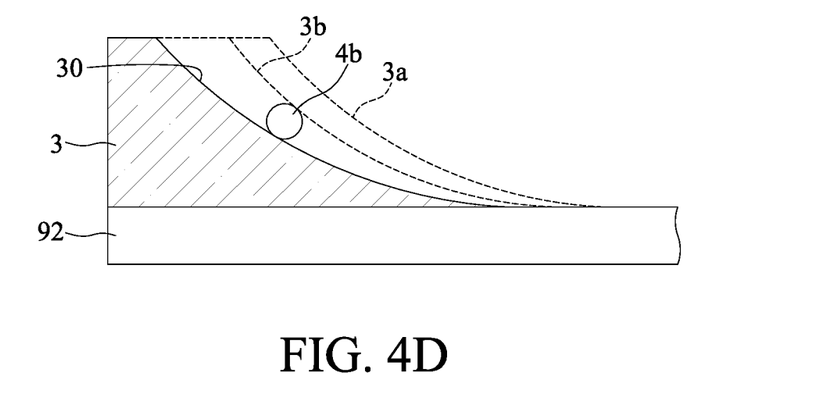
Figure 4E:
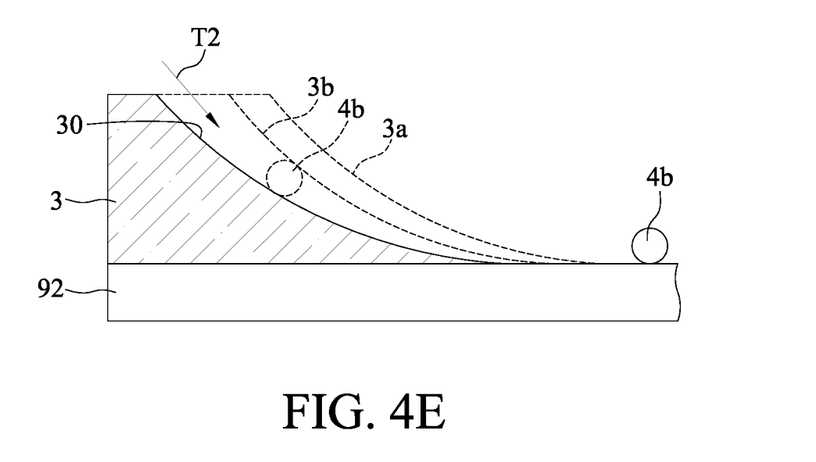

For example, when the cutter 18 performs the cutting operation (e.g., a material 3a to be cut or a cutting material 3a as shown in FIG. 4B) on the cutting path (i.e., the predetermined path for generating the trenches 30) of the target object 3, the rotating shaft 13 drives the cutter 18 to oscillate left and right to move the cutter 18 in (e.g., the oscillating direction F2 as shown in FIG. 2A-3) for cutting the material 3a to be cut, and to move the cutter 18 out (e.g., the oscillating direction F1 as shown in FIG. 2A-2) away from a surface 30a of the target object 3, so as to remove a foreign object (e.g., scrap) 4a (e.g., a removing direction T1 of scrap as shown in FIG. 4C) on the cutting path of the target object 3 via a cutting fluid (which can provide functions such as lubricating the cutter 18 and dissipating the heat of the target object 3), so that the cutter 18 will not rub the target object 3 through the foreign object 4a during the subsequent cutting. By increasing the frequency, the oscillating amplitude of the cutter 18 is increased, so as to continuously move the cutter 18 in to cut a material 3b to be cut or a cutting material 3b (as shown in FIG. 4D) and provide cutting fluid after retracting the cutter 18 (e.g., moving the cutter 18 out) to remove a foreign object 4b (e.g., a removing direction T2 of scrap as shown in FIG. 4E). At this time, when the cutter 18 is close to the bottom area of the target object 3, the blade surface thereof can still maintain the predetermined force effect without passivation, so there is no need to increase the grinding force, such that the stress can be avoided from concentrating around the cutting path to greatly reduce the possibility of brittle failure, thereby effectively preventing the target object 3 from occurring undesirable conditions such as cracking or chipping.

In addition, the cutter 18 will not rub the target object 3 through the foreign object 4a, 4b during cutting, so that the phenomenon of frictional heat accumulation will not occur, so as to improve the heat dissipation effect of the cutting operation, and the foreign object 4a, 4b is removed via the cutting fluid on the cutting path, so that there is no foreign object 4a, 4b remaining in the cutting fluid on the target object 3, such that the cutter 18 can be provided with good lubricating effect.

Moreover, the cutter 18 will not rub the target object 3 through the foreign object 4a, 4b during cutting, so the blade surface of the cutter 18 can be kept well, which is beneficial to increase the service life of the cutter 18.

Furthermore, the ultrasonic device 1 eliminates high-frequency vibrations via the configuration of the shaft member 14, so that the action member 12 stably vibrates the driving member 11 at a low frequency (e.g., less than 10 kHz), and causes the driving member 11 and the rotating shaft 13 to generate oscillation movements (e.g., moving the cutter 18 in and out).

To sum up, in the ultrasonic device 1 of the present disclosure, the action member 12 vibrates the driving member 11 with radial ultrasonic waves, so that the driving member 11 oscillates to drive the rotating shaft 13 and the cutter 18 together to synchronously oscillate in the same direction, such that the cutter 18 can perform cutting, scrap removal and lubrication during the cutting operation. Therefore, compared with the prior art, the ultrasonic device 1 of the present disclosure can address the problems caused by the conventional grinding technique by using a general circular cutting blade, so as to avoid problems such as chipping and scrap jamming The present disclosure can not only improve the production capacity, but also greatly reduce the cost of cutting operations for mass production, and can even increase the service life of the cutter 18.

The above embodiments are set forth to illustrate the principles of the present disclosure and the effects thereof, and should not be interpreted as to limit the present disclosure. The above embodiments can be modified by one of ordinary skill in the art without departing from the scope of the present disclosure as defined in the appended claims. Therefore, the scope of protection of the right of the present disclosure should be listed as the following appended claims.

What is claimed is:

1. An ultrasonic device, comprising:
   a carrier;
   a driving arm pivotally connected to the carrier via a shaft member in an oscillating manner, wherein the shaft member is fixed relative with the carrier;
   at least one spring connected to the driving arm and on the carrier;
   an actuator configured to actuate the driving arm to oscillate the driving arm; and
   a rotating shaft connected to the driving arm, wherein the driving arm drives the rotating shaft to oscillate together, and the rotating shaft rotates relative to the carrier.

2. The ultrasonic device of claim 1, wherein the carrier is a housing and has an accommodation space therein to accommodate the driving arm and the actuator, and wherein the rotating shaft is exposed to the accommodation space by passing through the carrier.

3. The ultrasonic device of claim 1, wherein the driving arm is an arm body.

4. The ultrasonic device of claim 3, wherein one side of the driving arm is pivotally connected to the carrier, such that the other side of the driving arm is displaced relative to the one side of the driving arm.

5. The ultrasonic device of claim 1, wherein the shaft member is fixed to the carrier.

6. The ultrasonic device of claim 1, wherein the actuator is in a form of an ultrasonic piezoelectric sheet.

7. The ultrasonic device of claim 1, further comprising a pressure sensor for sensing pressure on the driving arm.

8. The ultrasonic device of claim 1, further comprising a cutter disposed on the rotating shaft.

9. The ultrasonic device of claim 1, further comprising a driver for driving the rotating shaft to rotate.

10. The ultrasonic device of claim 9, wherein the driver has a power shaft linked with the rotating shaft, and wherein the power shaft and the rotating shaft are not coaxial.

11. The ultrasonic device of claim 9, wherein the driver is connected to the rotating shaft via a flexible coupling.

\* \* \* \* \*